(12) United States Patent
Di Napoli

(10) Patent No.: US 10,870,457 B2
(45) Date of Patent: Dec. 22, 2020

(54) LOCKABLE BICYCLE HANDLEBAR HARDWARE

(71) Applicant: Edward Di Napoli, Massapequa Park, NY (US)

(72) Inventor: Edward Di Napoli, Massapequa Park, NY (US)

( * ) Notice: Subject to any disclaimer, the term of this patent is extended or adjusted under 35 U.S.C. 154(b) by 245 days.

(21) Appl. No.: 16/224,445

(22) Filed: Dec. 18, 2018

(65) Prior Publication Data

US 2020/0189677 A1 Jun. 18, 2020

(51) Int. Cl.
*B62H 5/06* (2006.01)
*E05B 71/00* (2006.01)
*B62K 21/22* (2006.01)

(52) U.S. Cl.
CPC .............. *B62H 5/06* (2013.01); *B62K 21/22* (2013.01); *E05B 71/00* (2013.01)

(58) Field of Classification Search
CPC ...... B62H 5/06; B62H 2005/008; B62H 5/02; B62H 5/04; E05B 71/00; B62K 21/22
USPC ........................... 70/182–187, 212, 233–236
See application file for complete search history.

(56) References Cited

U.S. PATENT DOCUMENTS

| | | | |
|---|---|---|---|
| 1,459,584 A * | 6/1923 | Ericsson ................... | B62H 5/06 70/233 |
| 2,551,503 A * | 5/1951 | Needham ............... | B62K 21/22 280/279 |
| 2,576,773 A | 11/1951 | Buxton | |
| 3,785,676 A | 1/1974 | Klein, Jr. | |
| 3,863,472 A | 2/1975 | Klingfus | |
| 4,509,349 A | 4/1985 | Partridge | |
| D341,801 S | 11/1993 | McCormack | |
| 5,442,973 A | 8/1995 | Liao | |
| 6,076,381 A | 6/2000 | Green | |
| 6,161,403 A * | 12/2000 | Surratt ..................... | B62H 5/04 70/183 |
| 7,497,454 B2 | 3/2009 | Liao | |
| 7,509,826 B2 * | 3/2009 | Niedrig ................... | B60R 25/00 70/185 |
| 8,141,892 B2 * | 3/2012 | Nakanishi ............... | B62H 5/02 280/271 |
| 9,475,534 B2 | 10/2016 | Gibson | |
| 2007/0277570 A1 * | 12/2007 | Yu ............................ | B62H 5/02 70/233 |

* cited by examiner

*Primary Examiner* — Lloyd A Gall

(57) ABSTRACT

A lockable bicycle handlebar hardware for easily securing a bicycle includes a bottom lock plate having a lower stem aperture and a lower lock aperture extending therethrough. The bottom lock plate has a recession around the lower stem aperture forming a bearing shelf. A bearing is coupled to the bottom lock plate and is selectively engageable with the bearing shelf. A top lock plate has an upper stem aperture and an upper lock aperture extending therethrough. A locking nut has a threaded aperture and a faceted perimeter. The lower stem aperture and the upper stem aperture are configured to receive a stem of a bicycle handlebar, the threaded aperture of the locking nut is configured to selectively engage with a threaded portion of the stem, and the lower lock aperture and the upper lock aperture are configured to receive a padlock when aligned.

6 Claims, 6 Drawing Sheets

LOCKABLE BICYCLE HANDLEBAR HARDWARE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to handlebar hardware and more particularly pertains to a new handlebar hardware for easily securing a bicycle.

BRIEF SUMMARY OF THE INVENTION

An embodiment of the disclosure meets the needs presented above by generally comprising a bottom lock plate having a lower stem aperture and a lower lock aperture extending therethrough. The bottom lock plate has a recession around the lower stem aperture forming a bearing shelf. A bearing is coupled to the bottom lock plate and is selectively engageable with the bearing shelf. A top lock plate has an upper stem aperture and an upper lock aperture extending therethrough. A locking nut has a threaded aperture and a faceted perimeter. The lower stem aperture and the upper stem aperture are configured to receive a stem of a bicycle handlebar, the threaded aperture of the locking nut is configured to selectively engage with a threaded portion of the stem, and the lower lock aperture and the upper lock aperture are configured to receive a padlock when aligned.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
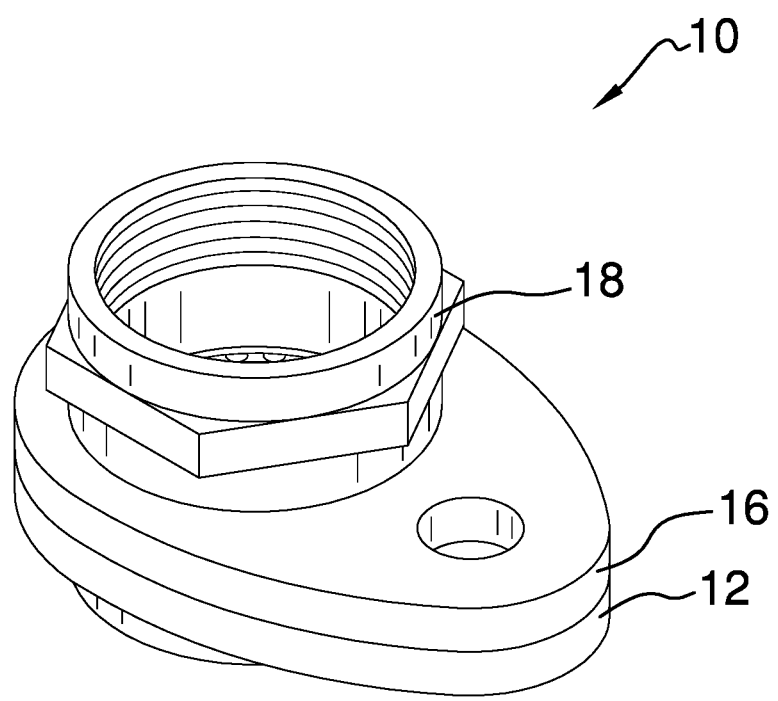
FIG. 1 is an isometric view of a lockable bicycle handlebar hardware according to an embodiment of the disclosure.
Figure 2:
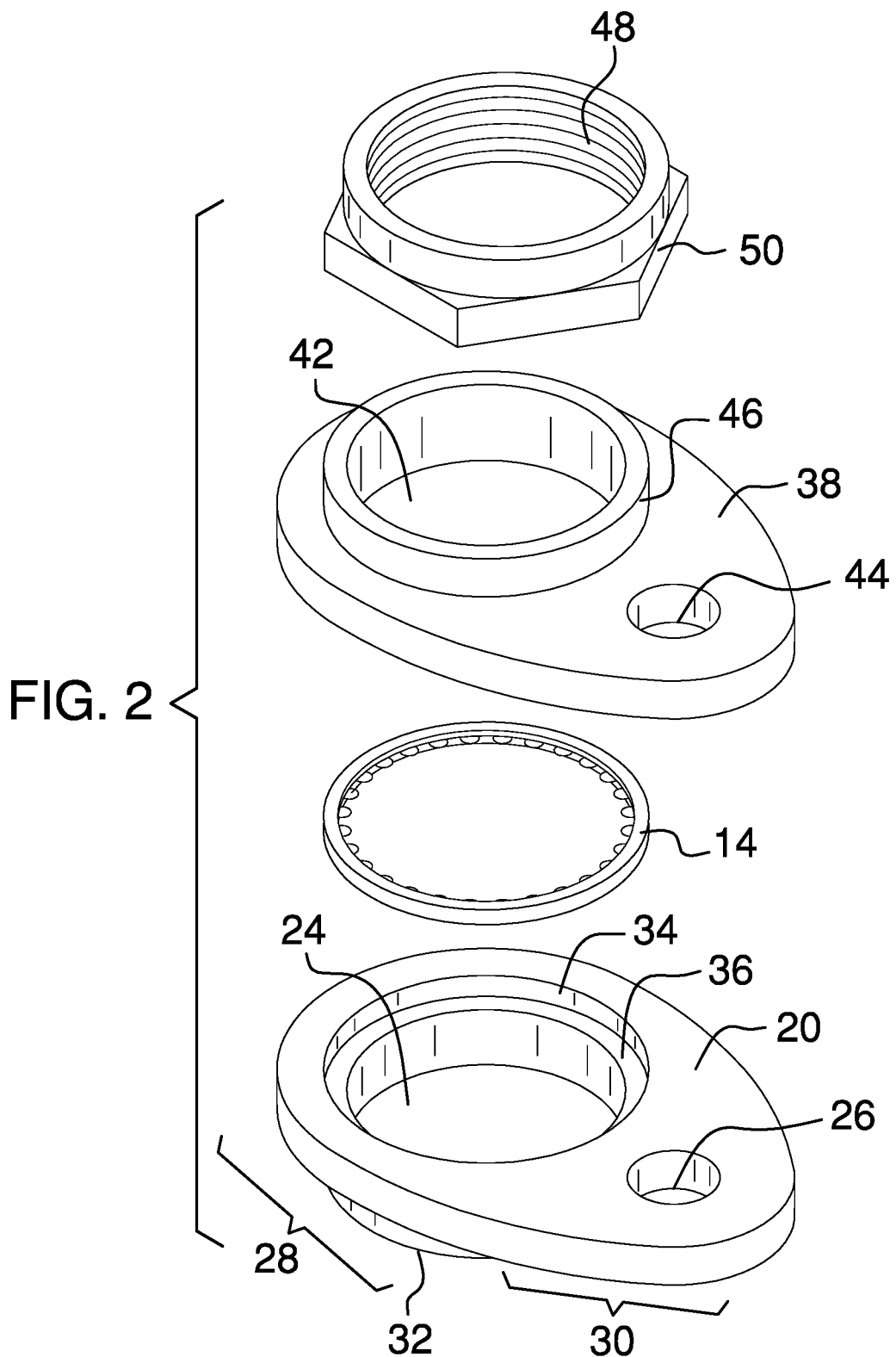
FIG. 2 is an exploded view of an embodiment of the disclosure.
Figure 3:
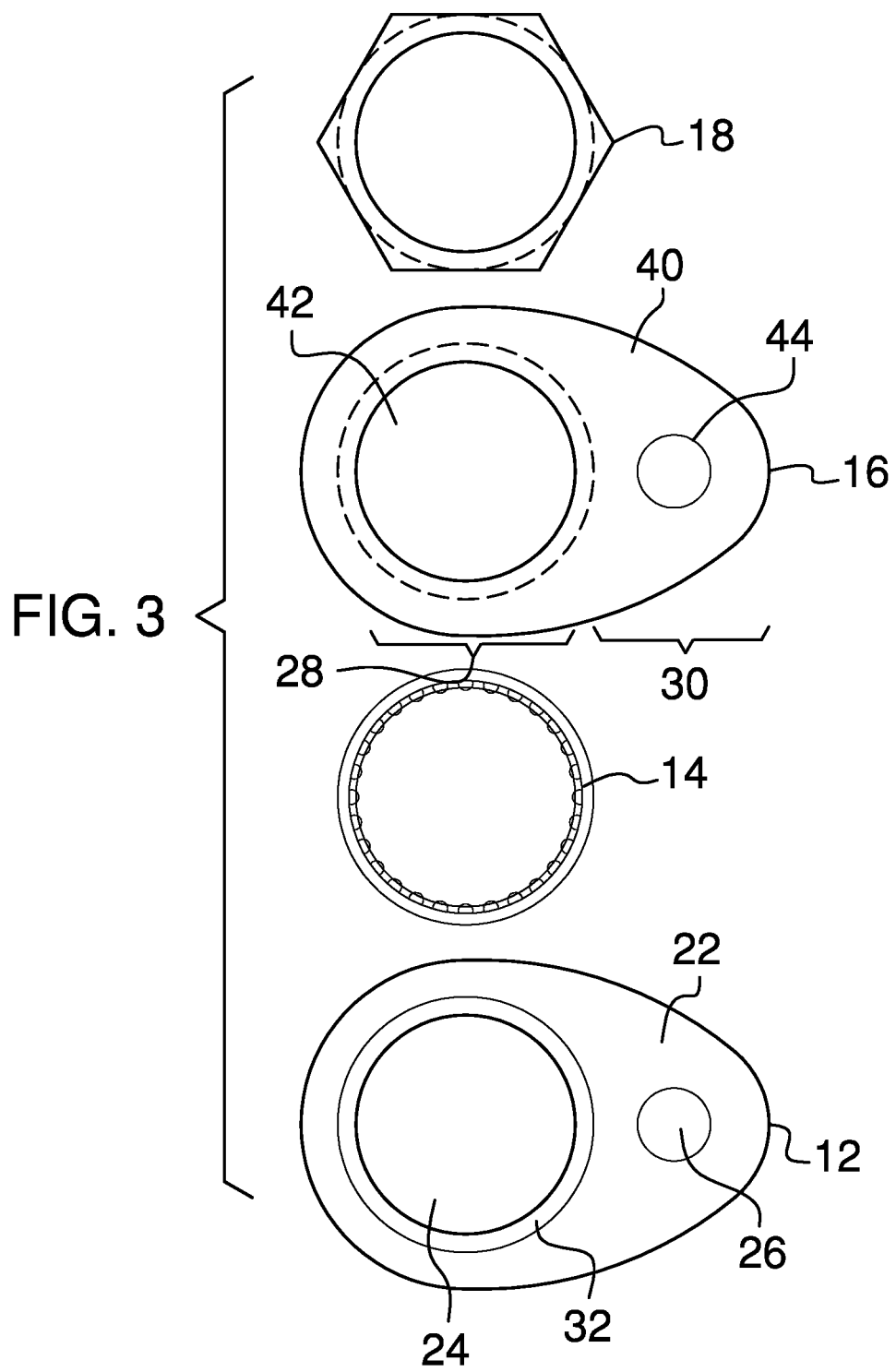
FIG. 3 is a bottom plan view of an embodiment of the disclosure.
Figure 4:
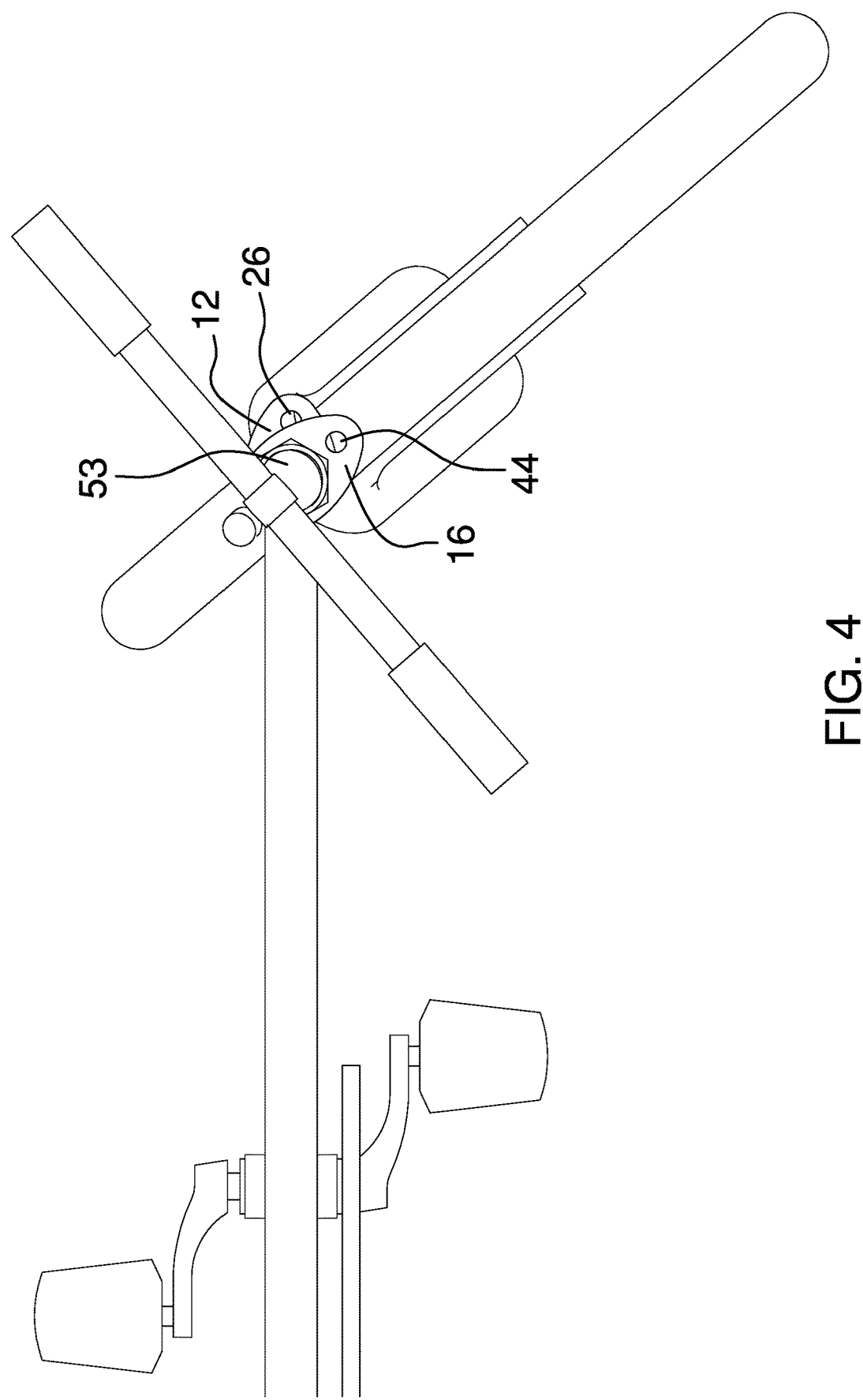
FIG. 4 is an in-use view of an embodiment of the disclosure.
Figure 5:
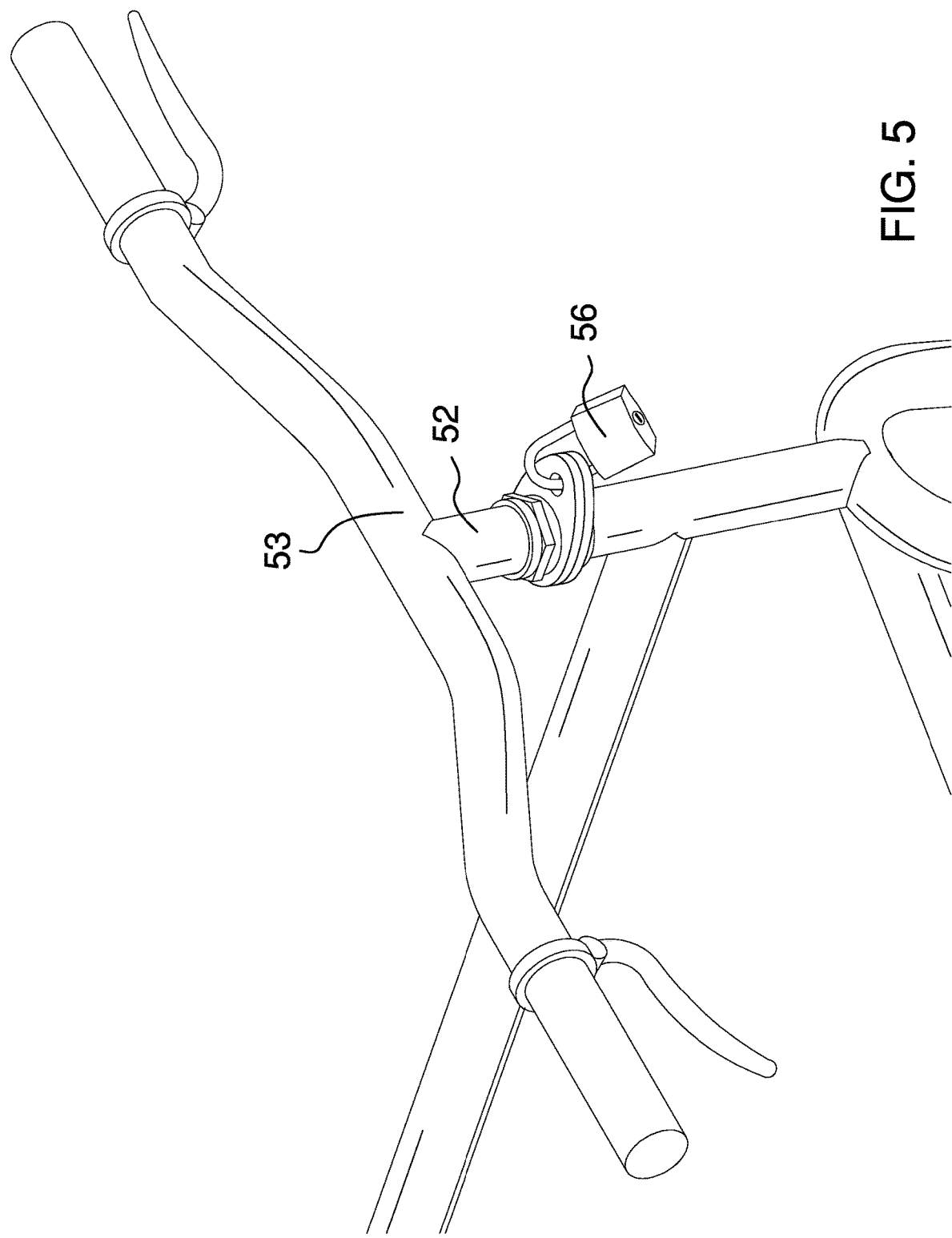
FIG. 5 is an in-use view of an embodiment of the disclosure.
Figure 6:
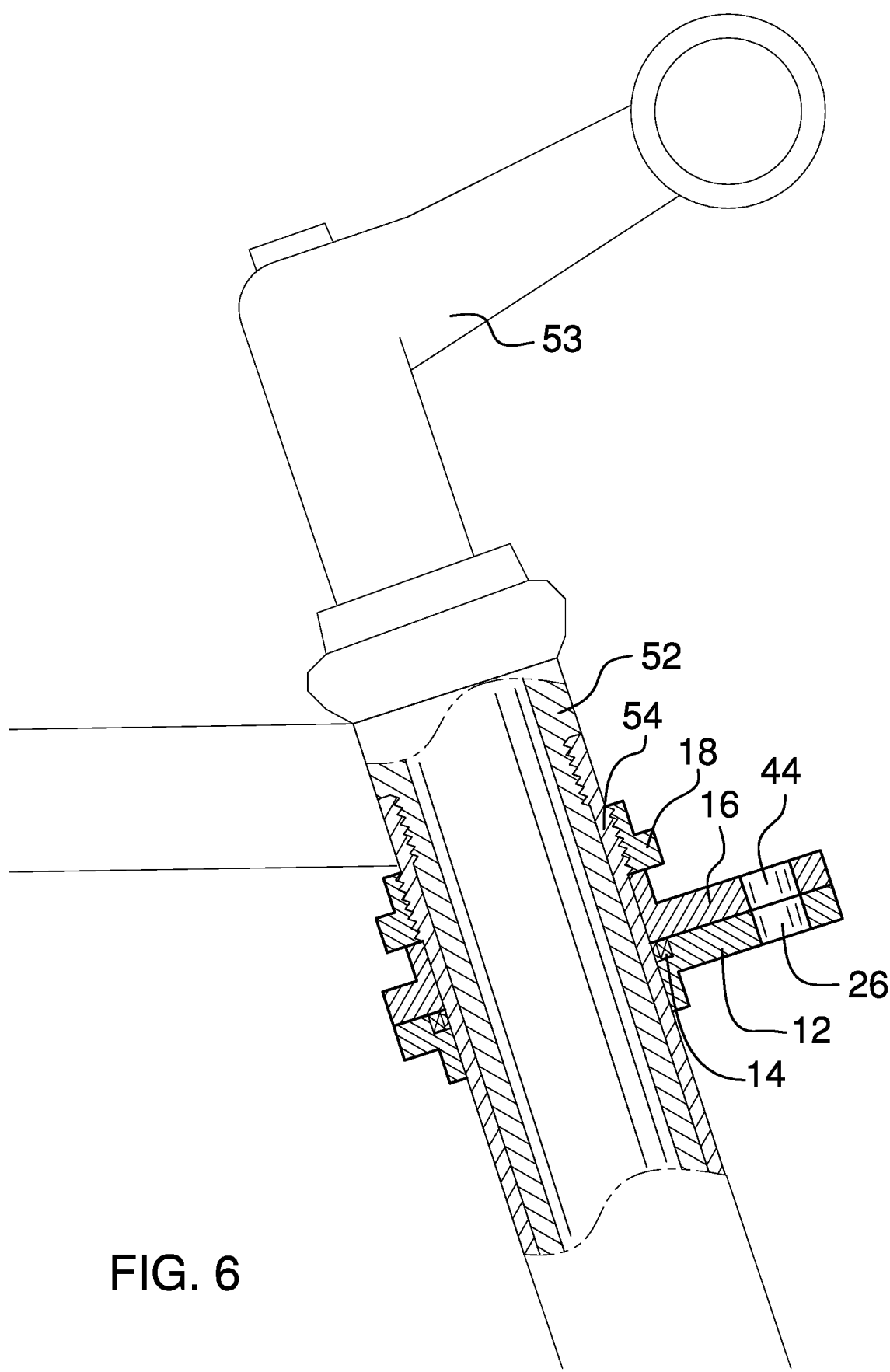
FIG. 6 is a cross-sectional view of an embodiment of the disclosure.

With reference now to the drawings, and in particular to FIGS. 1 through 6 thereof, a new handlebar hardware embodying the principles and concepts of an embodiment of the disclosure and generally designated by the reference numeral 10 will be described.

As best illustrated in FIGS. 1 through 6, the lockable bicycle handlebar hardware 10 generally comprises a bottom lock plate 12, a bearing 14, a top lock plate 16, and a locking nut 18. The bottom lock plate 12 has a top face 20, a bottom face 22, a lower stem aperture 24, and a lower lock aperture 26. The bottom lock plate 12 may be egg-shaped and has a wide portion 28 and a narrow portion 30. The lower stem aperture 24 extends through the wide portion 28 from the top face 20 through the bottom face 22. The lower lock aperture 26 extends through the narrow portion 30 from the top face 20 through the bottom face 22. A bottom collar 32 extends from the bottom face 22 around the lower stem aperture 24. The top face 20 has a recession 34 around the lower stem aperture 24 extending to the bottom collar 32. The recession 34 forms a bearing shelf 36. The bearing 14 is coupled to the bottom lock plate 12 by being selectively engageable with the bearing shelf 36.

The top lock plate 16 has an upper face 38, a lower face 40, an upper stem aperture 42, and an upper lock aperture 44. The top lock plate 16 may be identically egg-shaped to the bottom lock plate 12. The upper stem aperture 42 extends through the wide portion 28 from the upper face 38 through the lower face 40. The upper lock aperture 44 extends through the narrow portion 30 from the upper face 38 through the lower face 40. The top lock plate 16 may have an upper collar 46 extending from the upper face 38 around the upper stem aperture 42. The locking nut 18 has a threaded aperture 48 and a faceted perimeter 50. The lower stem aperture 24 and the upper stem aperture 42 are configured to receive a stem 52 of a bicycle handlebar 53. The threaded aperture 48 of the locking nut is configured to selectively engage with a threaded portion 54 of the stem.

The lower lock aperture 26 and the upper lock aperture 44 are configured to receive a padlock 56 when aligned.

In use, the padlock 56 is locked through the lower lock aperture 26 and the upper lock aperture 44 to prevent the bicycle handlebar 53 from being turned to thwart bicycle theft.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lockable bicycle handlebar hardware comprising:
   a bottom lock plate, the bottom lock plate having a lower stem aperture and a lower lock aperture extending therethrough, the bottom lock plate having a recession around the lower stem aperture forming a bearing shelf;
   a bearing coupled to the bottom lock plate, the bearing being selectively engageable with the bearing shelf;
   a top lock plate, the top lock plate having an upper stem aperture and an upper lock aperture extending therethrough; and
   a locking nut, the locking nut having a threaded aperture and a faceted perimeter;
   wherein the lower stem aperture and the upper stem aperture are configured to receive a stem of a bicycle handlebar, the threaded aperture of the locking nut is configured to selectively engage with a threaded portion of the stem, and the lower lock aperture and the upper lock aperture are configured to receive a padlock when aligned.

2. The lockable bicycle handlebar hardware of claim 1 further comprising the bottom lock plate having a top face and a bottom face, the lower stem aperture extending from the top face through the bottom face, the lower lock aperture extending from the top face through the bottom face, the bottom lock plate having a bottom collar extending from the bottom face around the lower stem aperture, the recession extending to the bottom collar.

3. The lockable bicycle handlebar hardware of claim 1 further comprising the top lock plate having an upper face and a lower face, the upper stem aperture extending from the upper face through the lower face, the upper lock aperture extending from the upper face through the lower face, the top lock plate having an upper collar extending from the upper face around the upper stem aperture.

4. The lockable bicycle handlebar hardware of claim 1 further comprising each of the bottom lock plate and the top lock plate being identical egg-shapes and having a wide portion and a narrow portion, the lower stem aperture and the upper stem aperture extending through the wide portion of the bottom lock plate and the top lock plate, respectively, the lower lock aperture and the upper lock aperture extending through the narrow portion of the bottom lock plate and the top lock plate, respectively.

5. A lockable bicycle handlebar hardware comprising:
   a bottom lock plate, the bottom lock plate having a top face, a bottom face, a lower stem aperture, and a lower lock aperture, the bottom lock plate being egg-shaped and having a wide portion and a narrow portion, the lower stem aperture extending through the wide portion from the top face through the bottom face, the lower lock aperture extending through the narrow portion from the top face through the bottom face, the bottom lock plate having a bottom collar extending from the bottom face around the lower stem aperture, the top face having a recession around the lower stem aperture extending to the bottom collar, the recession forming a bearing shelf;
   a bearing coupled to the bottom lock plate, the bearing being selectively engageable with the bearing shelf;
   a top lock plate, the top lock plate having an upper face, a lower face, an upper stem aperture, and an upper lock aperture, the top lock plate being identically egg-shaped to the bottom lock plate, the upper stem aperture extending through the wide portion from the upper face through the lower face, the upper lock aperture extending through the narrow portion from the upper face through the lower face, the top lock plate having an upper collar extending from the upper face around the upper stem aperture; and
   a locking nut, the locking nut having a threaded aperture and a faceted perimeter;
   wherein the lower stem aperture and the upper stem aperture are configured to receive a stem of a bicycle handlebar, the threaded aperture of the locking nut is configured to selectively engage with a threaded portion of the stem, and the lower lock aperture and the upper lock aperture are configured to receive a padlock when aligned.

6. A padlock and lockable bicycle handlebar hardware system comprising:
   a padlock;
   a bottom lock plate, the bottom lock plate having a top face, a bottom face, a lower stem aperture, and a lower lock aperture, the bottom lock plate being egg-shaped and having a wide portion and a narrow portion, the lower stem aperture extending through the wide portion from the top face through the bottom face, the lower lock aperture extending through the narrow portion from the top face through the bottom face, the bottom lock plate having a bottom collar extending from the bottom face around the lower stem aperture, the top face having a recession around the lower stem aperture extending to the bottom collar, the recession forming a bearing shelf;
   a bearing coupled to the bottom lock plate, the bearing being selectively engageable with the bearing shelf;
   a top lock plate, the top lock plate having an upper face, a lower face, an upper stem aperture, and an upper lock aperture, the top lock plate being an equivalent egg-shape to the bottom lock plate, the upper stem aperture extending through the wide portion from the upper face through the lower face, the upper lock aperture extending through the narrow portion from the upper face through the lower face, the top lock plate having an upper collar extending from the upper face around the upper stem aperture; and a locking nut, the locking nut having a threaded aperture and a faceted perimeter;

wherein the lower stem aperture and the upper stem aperture are configured to receive a stem of a bicycle handlebar, the threaded aperture of the locking nut is configured to selectively engage with a threaded portion of the stem, and the lower lock aperture and the upper lock aperture receive the padlock when aligned.

* * * * *